Jan. 29, 1957 J. R. ADRIANSEN 2,779,906
BRAKING SYSTEMS
Filed March 26, 1954
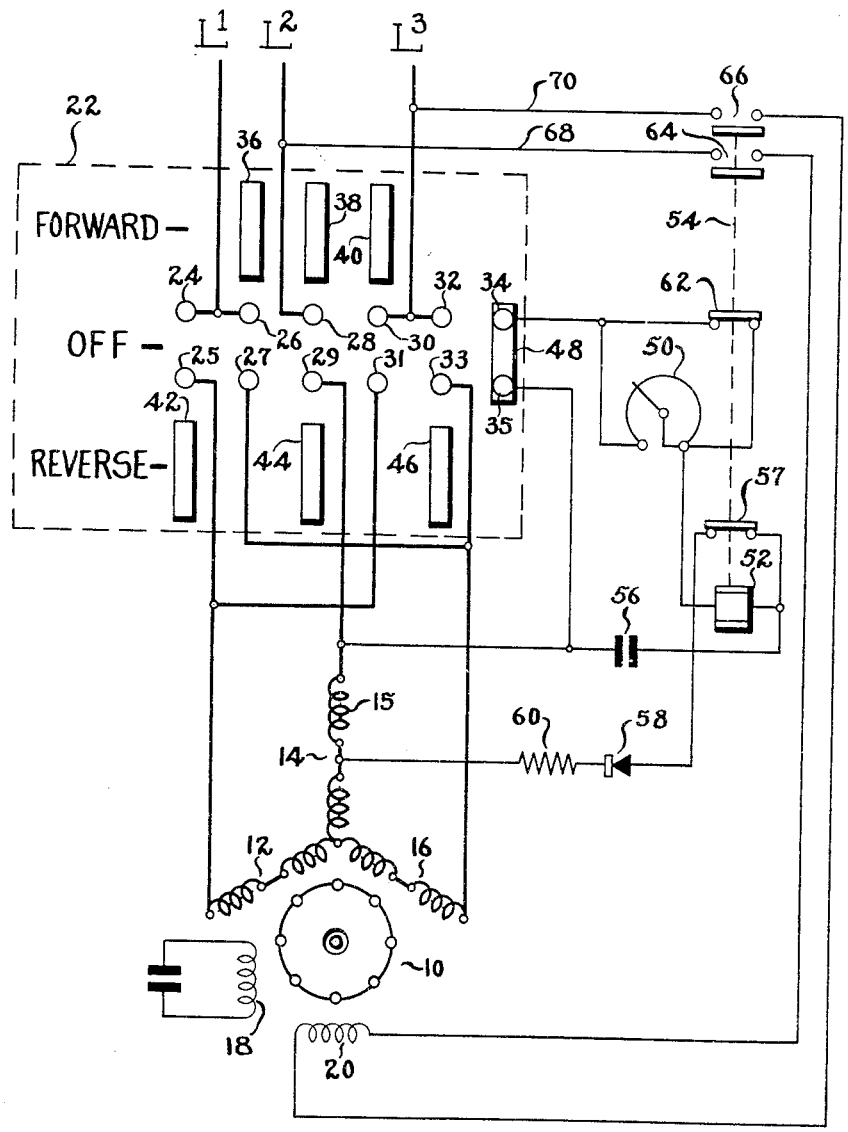
Inventor
John R. Adriansen
By W. E. Lyon
Attorney

United States Patent Office 2,779,906
Patented Jan. 29, 1957

2,779,906
BRAKING SYSTEMS

John R. Adriansen, Cincinnati, Ohio, assignor to Cutler-Hammer, Inc., Milwaukee, Wis., a corporation of Delaware Application March 26, 1954, Serial No. 418,986

5 Claims. (Cl. 318—211)

This invention relates to improvements in braking systems. In partciular it relates to systems for applying braking torque to an electric motor for a predetermined time interval after the supply of power to the motor is interrupted.

An object of the invention is to provide improved braking systems.

Another object of the invention is to provide improved systems for applying braking torque to an electric motor for a predetermined time interval after the supply of power to the motor is interrupted.

A more specific object is to provide a system of the aforedescribed character for electric motors which have braking windings included therein.

Other objects and advantages of the invention will hereinafter appear.

The accompanying drawing illustrates diagrammatically a system embodying the invention, it being understood that various modifications may be made in the embodiment illustrated and that other embodiments of the invention are possible without departing from the spirit of the invention or the scope of the appended claims.

In the drawing, the numeral 10 designates an electric induction motor having 3-phase windings 12, 14 and 16 and 2-phase braking windings 18 and 20. Power is supplied to motor 10 from alternating current supply lines L1, L2 and L3 through a master controller 22.

The controller 22 comprises fingers 24 through 35, Forward segments 36, 38 and 40, Reverse segments 42, 44 and 46, and an "off" segment 48. In the Forward position of the controller 22 winding 12 is connected by segment 40 to line L3 through fingers 30 and 31, winding 14 is connected by segment 38 to line L2 through fingers 28 and 29, and winding 16 is connected by segment 36 to line L1 through fingers 26 and 27. In the Reverse position of controller 22, fingers 24 and 25, 28 and 29 and 32 and 33 connect windings 12, 14 and 16 to lines L1, L2 and L3 through the medium of segments 42, 44 and 46, respectively.

Fingers 34 and 35 are included in a loop circuit comprising finger 34, a rheostat 50, the operating winding 52 of a relay 54, a capacitor 56 and finger 35. In the "off" position of controller 22, this loop circuit is made continuous by segment 48 which connects fingers 34 and 35. The capacitor 56 is also included in a loop circuit comprising normally closed contacts 57 of relay 54, a rectifier unit 58, a limiting resistor 60 and one-half 15 of winding 14.

Relay 54 also has normally closed contacts 62 which are connected in shunt with rheostat 50 and normally open contacts 64 and 66 which are connected in conductors 68 and 70, respectively. When contacts 64 and 66 are closed, brake winding 20 is energized directly from lines L2 and L3 through conductors 68 and 70. When phase windings 12, 14 and 16 are energized by switching of controller 22 to either the Forward or Reverse positon, fingers 34 and 35 are disconnected and capacitor 56 is charged through, contacts 57, rectifier unit 58 and resistor 60 to a voltage substantially equal to the peak voltage across the section 15 of winding 14.

When the motor 10 is to be stopped, controller 22 is moved to the "off" position wherein segment 48 connects fingers 34 and 35. Capacitor 56 is prevented by rectifier unit 58 from discharging through section 15 of winding 14. Instead, capacitor 56 discharges through relay coil 52, contacts 62 and segment 48. At the first surge of discharge current through coil 52, contacts 64 and 66 are closed and current flows from lines L2 and L3 to energize winding 20 and apply braking torque to the motor 10. At the same time contacts 62 open so that capacitor 56 thereafter is discharged through the series circuit combination of coil 52 and rheostat 50, and contacts 57 open to prevent flow in the capacitor discharge circuit, of current induced in portion 15 of winding 14 when brake winding 20 is energized. Because of the addition in the circuit of rheostat 50, capacitor 56 discharges at a lower rate. The current magnitude required to maintain the relay in operated condition is very small so that contacts 64 and 66 remain closed for a predetermined time sufficiently long to permit motor 10 to be braked a desired amount. The braking time may be adjusted by adjustment of rheostat 50 to change the time constant of the capacitor discharge circuit.

It will be apparent that the voltage drop across winding 52 will be less than the voltage drop across capacitor 56 when rheostat 50 is included in the discharge circuit. However, in practice this has proven not to be a disadvantage. Coil 52 will not release the relay contacts until the voltage thereacross has diminished to a value so low that the loss of voltage in rheostat 50 is not material. Inclusion of the rheostat 50 makes it possible to adjust the time constant of the capacitor discharge circuit over a relatively wide range.

In the system illustrated, the brake windings 20 and 18 are included in motor 10. It will be apparent that winding 20 could comprise the operating winding of a separate brake and, if required, contacts 64 and 66 could be normally closed. Also capacitor 56 need not be connected to winding 14. It is required for accurate timing that the source of capacitor charging voltage be constant but any constant source may be employed. The connections shown in the drawing are convenient to be used when the phase windings of the motor may be reconnected for operation of the motor at different supply voltages. For example, the motor winding connections illustrated are suitable for operation of the motor when connected to a 440-volt supply source. The half-sections of each winding would be connected in parallel for operation of the motor when connected to a 220 volt supply soure. In the latter case the capacitor charging circuit would be connected from line L2 to the neutral point of the windings.

The value of resistor 60 may be selected so that the charging circuit of capacitor 56 approximates the acceleration curve of motor 10 so that, if the controller 22 is returned to "off" position before the motor accelerates to full speed, the charge on capacitor 56 and the braking interval will be appropriately reduced.

I claim:

1. In combination, an electric motor having a main energizing winding adapted to be reconnected for operation of the motor at different supply voltages, a capacitor and a rectifier unit series connected across at least a portion of said main energizing winding for energization by the latter when said winding is energized to charge said capacitor, brake means for said motor having an auxiliary winding for said motor and an energizing circuit therefor, a relay having a contact in the energizing circuit of said auxiliary winding and having a relay operating winding, and means acting when said motor is de-energized to simultaneously connect said relay operating winding in shunt circuit with said capacitor to operate said contacts during discharge of said capacitor to effect operation of said auxiliary winding.

2. In a control system for an electric motor, means to energize and de-energize the motor, brake means for the motor comprising a braking winding for the motor, a capacitor, means to electrically charge said capacitor as a selected function of time during periods when the motor is energized, a relay having an operating winding, means acting when the motor is de-energized to simultaneously connect said capacitor to be discharged through the operating winding of said relay, said relay further having a contact operable to establish an energizing circuit for the operating winding of said brake means.

3. The combination defined in claim 2 in which there is a resistor connected in series circuit with the operating winding of said relay, said relay having a normally closed contact connected in shunt circuit with said resistor whereby said capacitor after operation of said relay to open said contact is discharged through the series circuit combination of said resistor and said operating winding of said relay.

4. For the alternating current braking winding of a motor having a main alternating current energizing winding and an energizing circuit including disconnect switch means for the main energizing winding, timing means operable to connect the alternating current braking winding for energization thereof to apply braking torque to the motor for a time interval following interruption of the main motor energizing circuit, and comprising a rectifier unit and a resistor, a capacitor connected to be charged through said rectifier unit and said resistor when said motor is energized, said resistor having a value relative to the capacity of said capacitor such that the charging period of the capacitor approximates the accelerating period of the motor, a relay having a contact in series with the energizing circuit of the braking winding and having an operating winding, and means for connecting said relay operating winding in the discharge circuit of said capacitor immediately when said motor is de-energized whereby said capacitor is discharged through said operating winding and said contact is operated while said capacitor is discharged to operate the braking winding.

5. In an electrical control for a motor having a plural phase stator winding and a single phase braking winding for developing for the motor a braking torque, in combination, timing means comprising a rectifier, a resistor and a capacitor series connected across a portion of one phase of the stator winding, means comprising a switch having forward, reverse and motor disconnect positions for energizing the stator winding in reverse directions thereby to charge said capacitor, the charging period of said capacitor being approximately equal to the accelerating period of the motor, means comprising auxiliary contacts on said switch effective upon actuation of the latter to its motor disconnect position to discharge said capacitor, means in circuit with said capacitor for adjusting the discharge period thereof, and means in circuit with and responsive to the discharge of said capacitor to disconnect the latter from the stator winding and to render the braking winding effective to develop a braking torque.

References Cited in the file of this patent

UNITED STATES PATENTS

| | | |
|---|---|---|
| 2,347,194 | Holliday | Apr. 25, 1944 |
| 2,493,670 | Harvey et al. | Jan. 3, 1950 |
| 2,534,423 | Douglas et al. | Dec. 19, 1950 |
| 2,627,059 | Noodleman | Jan. 27, 1953 |
| 2,680,829 | Rhyne et al. | June 8, 1954 |